United States Patent [19]

Garelick

[11] Patent Number: 5,385,323
[45] Date of Patent: Jan. 31, 1995

[54] TELESCOPED TUBULAR SUPPORT MEMBERS

[76] Inventor: Richard J. Garelick, 3324 Edmund Blvd., Minneapolis, Minn. 55406

[21] Appl. No.: 136,018

[22] Filed: Oct. 14, 1993

[51] Int. Cl.⁶ .......................................... F16M 11/00
[52] U.S. Cl. .................................... 248/161; 248/157; 248/188.5; 297/344.18; 403/109; 403/377
[58] Field of Search .................... 248/161, 188.5, 132, 248/150, 405, 407, 411, 412, 413; 403/377, 109, 362, 320; 297/344.18

[56] References Cited

U.S. PATENT DOCUMENTS

| | | | |
|---|---|---|---|
| 3,007,014 | 10/1961 | Bentman | 248/161 X |
| 3,285,207 | 11/1966 | Vom Hagen | 248/161 X |
| 3,667,716 | 6/1972 | Fries | 248/405 |
| 4,761,092 | 8/1988 | Nakatani | 248/188.5 X |
| 5,249,881 | 10/1993 | Austin et al. | 403/377 X |
| 5,285,733 | 2/1994 | Waibel | 248/188.5 X |

*Primary Examiner*—Ramon O. Ramirez
*Attorney, Agent, or Firm*—Jacobson and Johnson

[57] ABSTRACT

A pair of rigid hollow tubular members are telescoped together with one of the members having a series of spaced-apart grooves running parallel to the axis and the other having a series of spaced-apart ribs running parallel to its axis with the ribs slidably engaged in the grooves and means for releasably applying radial force between the two tubular members to force the ribs and the grooves into tight engagement to frictionally lock the tubular members together in a very stable fashion so they support a load without wobbling yet can be released when necessary.

10 Claims, 7 Drawing Sheets

TELESCOPED TUBULAR SUPPORT MEMBERS

FIELD OF THE INVENTION

This invention in general is directed toward providing slidably engaged telescoped tubular support members which can be slidably engaged with one another and releasably tightly frictionally locked together so they are extremely stable and will not wobble. More particularly, the invention is directed toward providing rigid tubular members which are vertically slidably telescoped together with one end of one of the members resting on a support surface and the other end of the other member attached to a carrying device such as a table top or a seat to place the latter at a desired elevation and then releasably locked in place firmly and stably so it can support a load in a wobble free manner. In one embodiment the elevation is adjustable.

DESCRIPTION OF THE PRIOR ART

Some prior art devices utilize a pair of rigid telescoped members which are releasably locked together at the desired adjusted position by a radially extending set screw or bolt. This has been found to be relatively unstable. After a few uses, the locking mechanism does not work very satisfactorily mainly because the holding force is applied at a point or over a very small length relative to the overall length of the two joined members. Another prior an device utilizes a pair of tapered members which are telescoped one within the other but this provides a very limited amount of adjustment and any effort to provide greater adjustability reduces the effectiveness of the locking arrangement. Also, if cylindrical members are used they will rotate about their axes with respect to one another.

SUMMARY OF THE INVENTION

In its most basic form the invention comprises a pair of hollow rigid tubular members with one tubular member having a plurality of spaced-apart inwardly extending grooves parallel to the tube axis and the other having a plurality of spaced-apart inwardly extending ribs. The two members are telescoped together with the ribs slidably engaged in the grooves. Manually operable means is provided to apply a radial force to bring the two members firmly together so that the sides of the ribs come into tight contact with the sides of the corresponding mating grooves so that the two members are frictionally tightly locked together. The groove and rib arrangement eliminates the possibility of the tubular members being rotated with respect to one another and also because the members are frictionally engaged over their telescoped lengths it provides a tight frictional fit which will not wobble and yet is releasable. The tubular members are made so that the ribs fit loosely in the grooves when the members are not locked together. Therefore, there is little or no danger of foreign material working its way into and sticking in the grooves or on the ribs to interfere with the sliding, adjusting or locking features. Also, because of the fairly wide tolerance of the fit between the two tubular members, they can be extruded rather than machined which means they are less expensive to produce.

Figure 7:
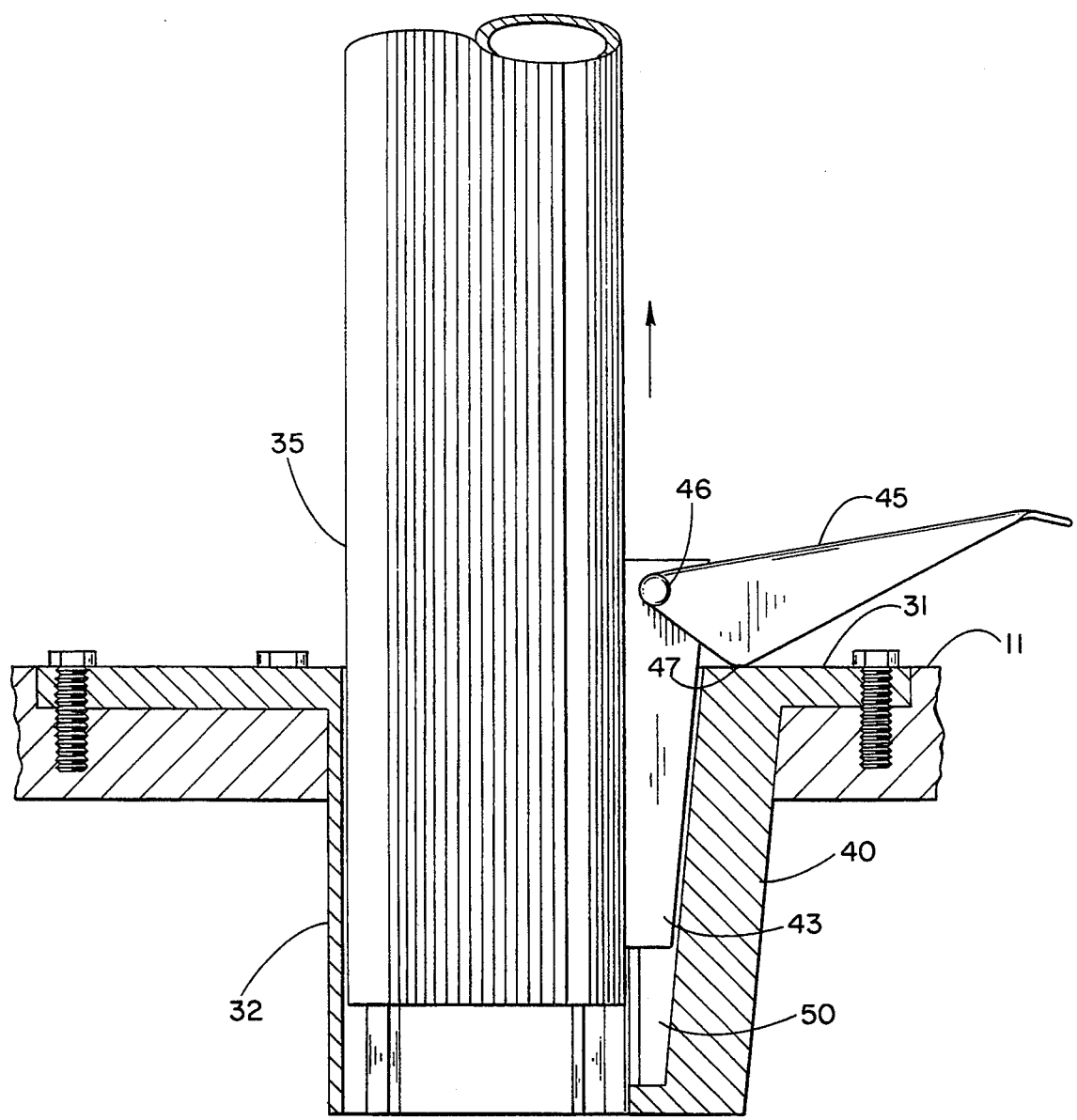
Figure 8:
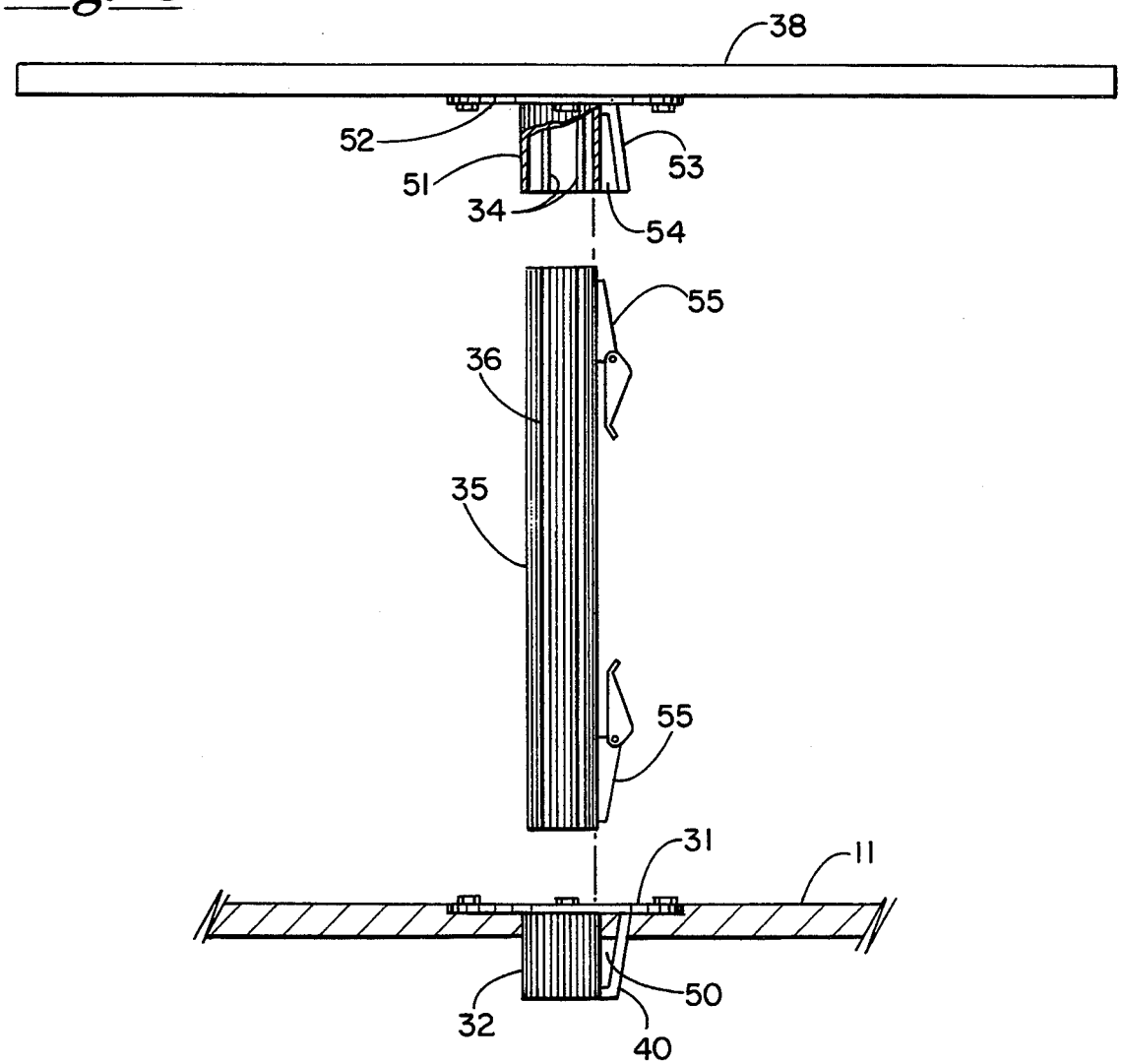

FIG: 6 is a somewhat enlarged partial breakaway view illustrating an alternative form of locking arrangement;

FIG. 7 is a view illustrating release of the locking arrangement shown in FIG. 7; and FIG. 8 is a blown-apart view of an alternate embodiment of the invention.

DESCRIPTION OF THE PREFERRED EMBODIMENTS

The features of the invention make it particularly attractive for use as a support device for pedestal-style seats or tables mounted on a deck or elsewhere aboard a ship or boat and so the invention will be described as used in that fashion. However, it should be kept in mind that the features of the invention have other uses and there is no intention to limit its use to shipboard devices.

Figure 1:
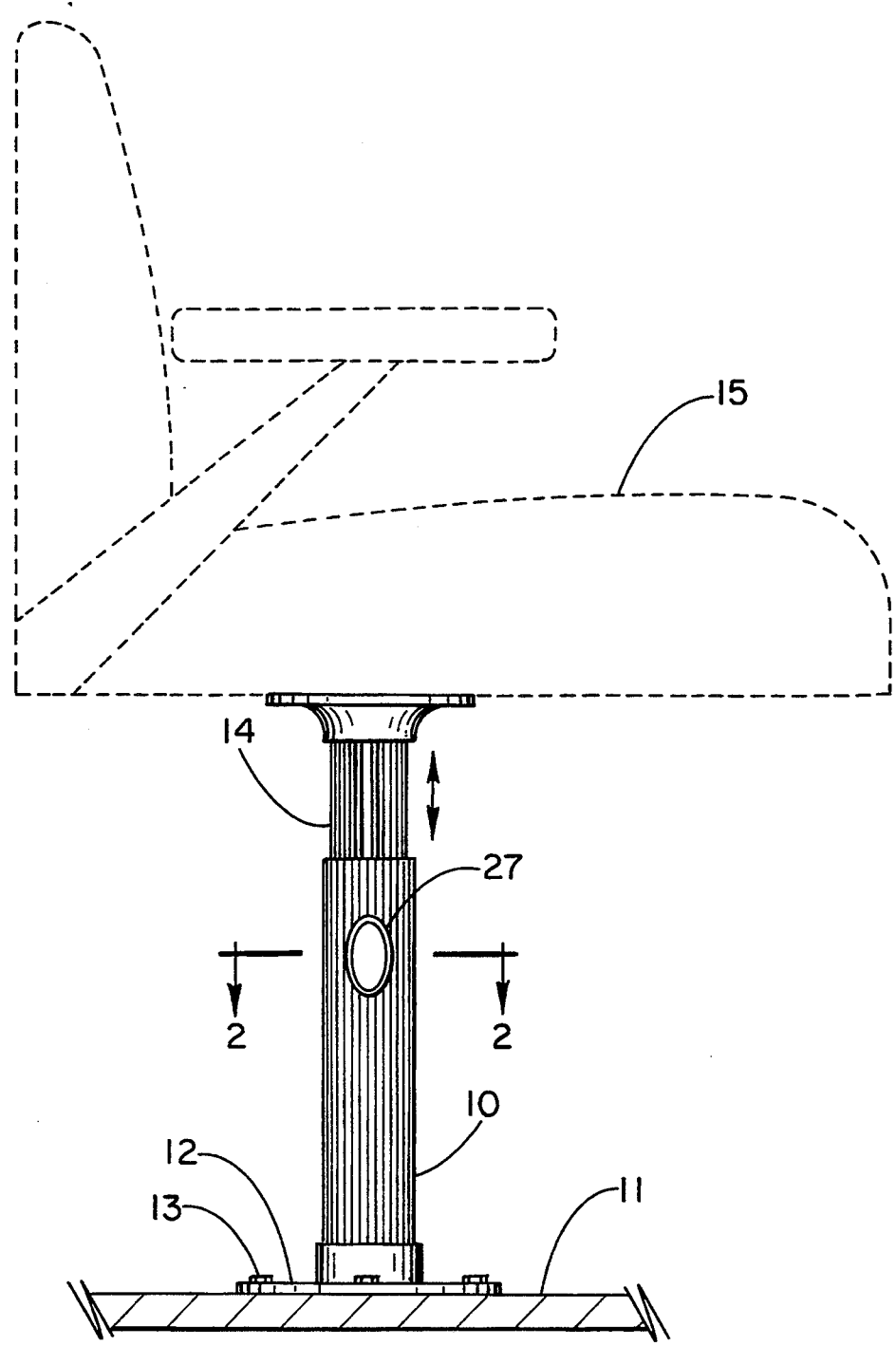
FIG. 1 is a vertical plan view illustrating the use of an embodiment of the invention for adjustably supporting a seat or a chair.

One embodiment of the invention, such as illustrated in FIG. 1, might be considered to be a somewhat permanent installation. A first vertically oriented hollow rigid tubular member 10 has its lower end resting on a supporting surface 11, which typically might be a floor or a platform or the deck of a boat. Tubular member 10 is attached in some fashion, such as by welding, to a base member 12 which may be attached to the supporting surface 11 in any convenient fashion such as by a number of bolts 13. A second rigid hollow tubular member 14 is telescoped or slidably engaged within tubular member 10 and is attached at its upper end to the underside of some suitable supporting or carrying article such as a boat seat 15 or a table top, not shown. A knob or handle 27 can be rotated to releasably lock together members 10 and 14 when the seat 15 is at the desired level or elevation.

Figure 2A:
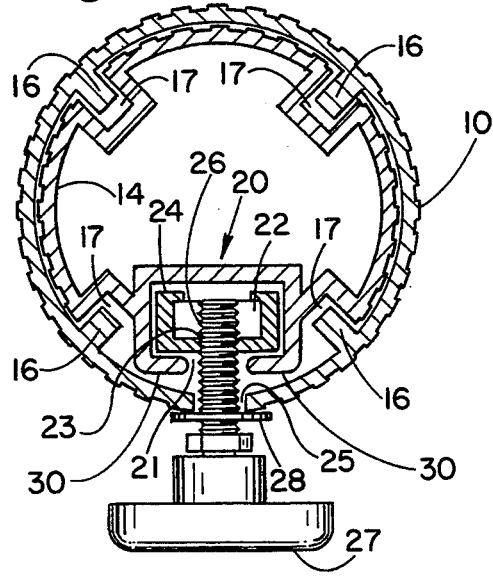
FIG. 2A an 2B are cross-sectional views as observed along viewing line 2 of FIG. 1 illustrating an embodiment of the releasable locking feature of the invention.
Figure 2B:
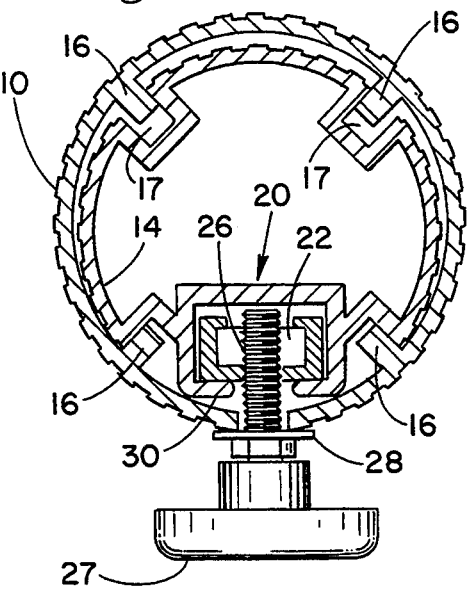
Figure 3:
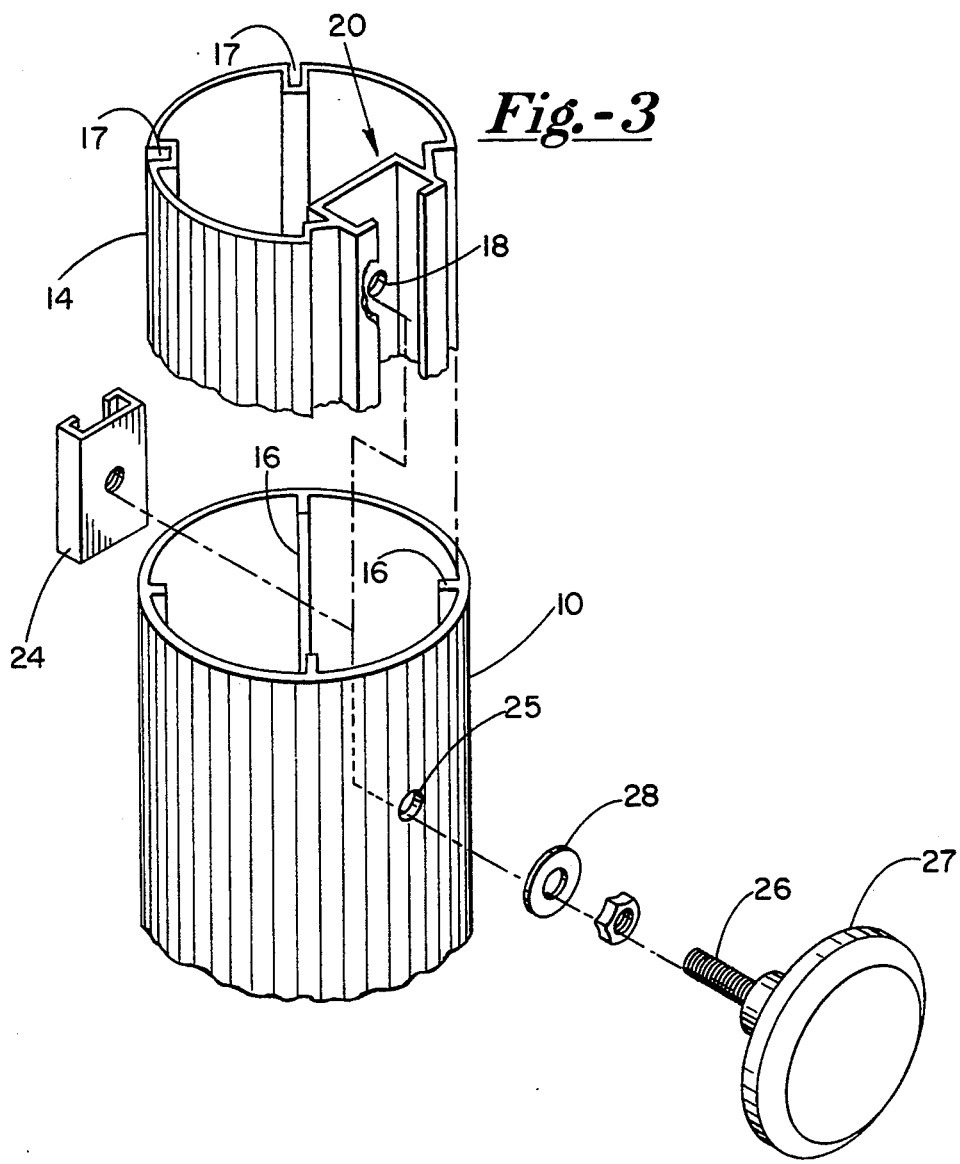
FIG. 3 is a perspective blown-apart assembly view of a preferred form of the locking feature of the invention.
Figure 4:
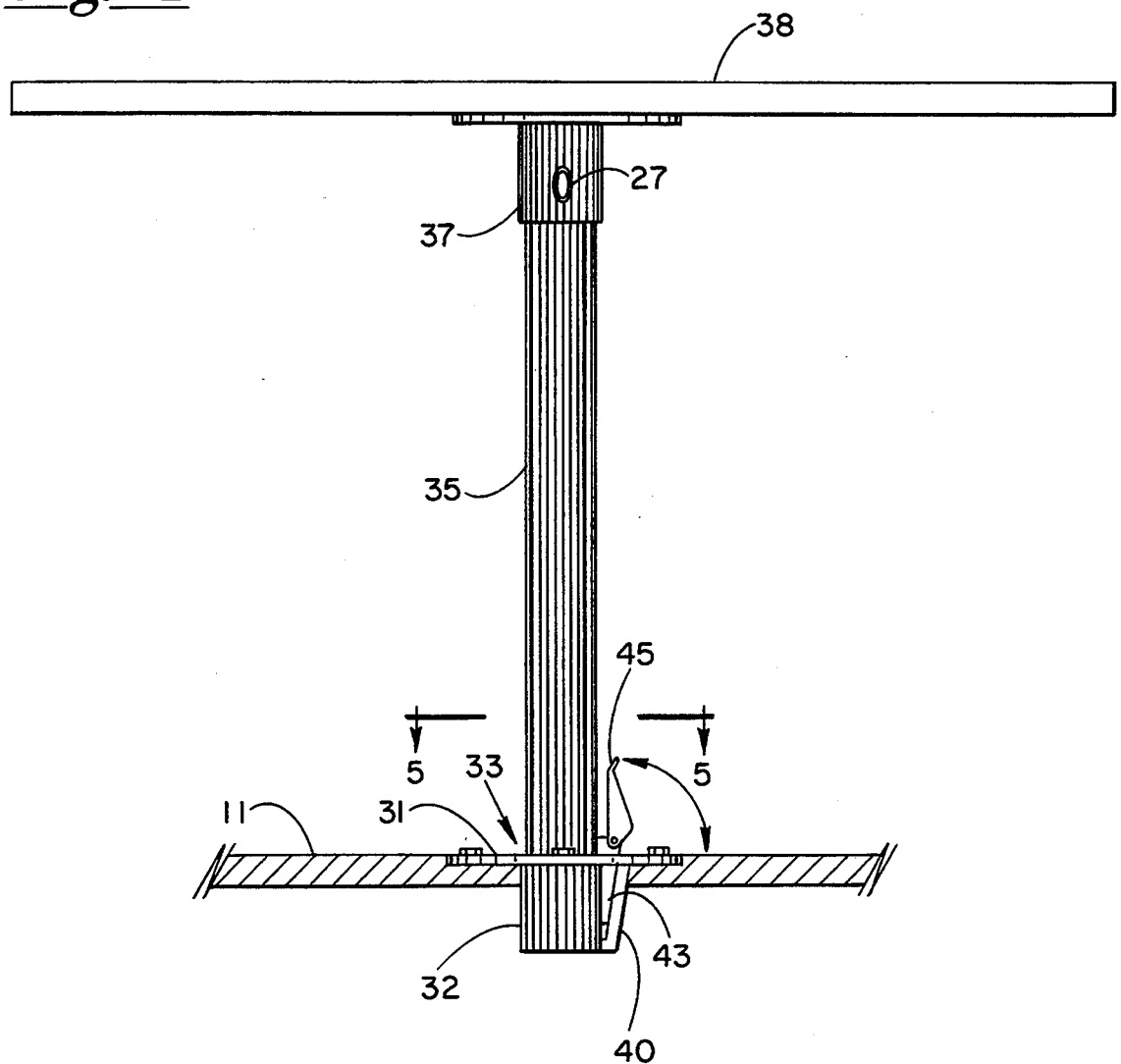
FIG. 4 is a vertical plan view illustrating another embodiment of the invention as utilized for supporting ,a,table top with an alternate form of locking mechanism.

FIGS. 2A and 2B show a locking arrangement, such as shown in FIG. 3, in the released and locked condition, respectively.

Tubular member 10 has a number of spaced-apart radially inwardly projecting ribs 16 which are parallel to its axis and extend over its entire length. Tubular member 14 has a number of similarly spaced radially inwardly projecting grooves 17 which similarly run parallel to the axis of tubular member 14 and over generally the entire length thereof. Tubular member 14 is telescoped within tubular member 10 with ribs 16 slidably engaged in corresponding grooves 17. Grooves 17 and ribs 16 are dimensioned so that they loosely fit together, when not locked, thereby leaving plenty of space so that any foreign material that might get inside the tubes will not stick in the grooves or against the ribs to interfere with the sliding and/or locking action. Further, as mentioned earlier, because the tolerances are quite loose, the respective members can be extruded rather than having to be machined so that the cost of production is less.

For providing an adjustable locking feature, an elongated U-shaped channel generally designated by reference numeral 20 is formed along tubular member 14. Conventionally, channel 20 is closed on three sides and has an opening 21 on one side with overhanging lips 30. Slidably resting in channel 20 is a nut 22 which has a threaded opening 23. Nut 22 may rest in a nut carrier 24. Extending radially through an opening 25 in outer tubular member 10 is a threaded rod 26 which is threadably engaged at one end in the threaded opening 23 of nut 22. Attached to the distal end of rod 26 on the outside of tubular member 10 is a knob or handle 27. A retaining ring 28 around rod 26 covers opening 25. With rod 26 partially unthreaded from opening 23 sufficiently so that nut 22, and/or its carrier 24, rests freely or slidably in channel 20, tubular member 14, with the attached holding device such as a chair 15 or a table top, can be slidably moved up and down to place the holding device at the suitable desired elevation. When in that position, knob 27 is manually rotated so that rod 26 is threaded into nut 22 to draw the nut, and/or its carrier 24, forward toward the knob or radially outward until nut 22 or carrier 24 contacts lips 30 to apply a radial force through lips 30 of channel 20 to member 14 and a radial force to tubular member 10 via retaining ring 28 so that the two tubular members 10 and 14 are pulled together until the sides of ribs 16 and corresponding grooves 17 in which they are engaged come into tight frictional contact so that tubular members 10 and 14 are then frictionally locked together over their telescoped length so that they are locked together over a relatively large area so they can support a load in a stable, wobble-free manner. To readjust the location of seat 15 knob 27 is rotated to partially unthread rod 26 from nut 22 until the radial force is removed to allow the tubular members to be moved up or down with respect to one another. FIG. 2A illustrates tubular members 10 and 14 as they would normally appear when they are moveable or adjustable with respect to one another and FIG. 2B illustrates the relationship between tubular members 10 and 14 and their respective ribs 16 and grooves 17 when the two members are locked together. Alternatively, a series of spaced-apart holes or openings 18 can be provided along channel 20 and red 26 can be made long enough to be inserted into openings 18. This would then provide positive stops for locating the tubular members lengthwise with respect to one another. This type of arrangement would be used to provide an adjustable support for a heavy load.

Figure 5:
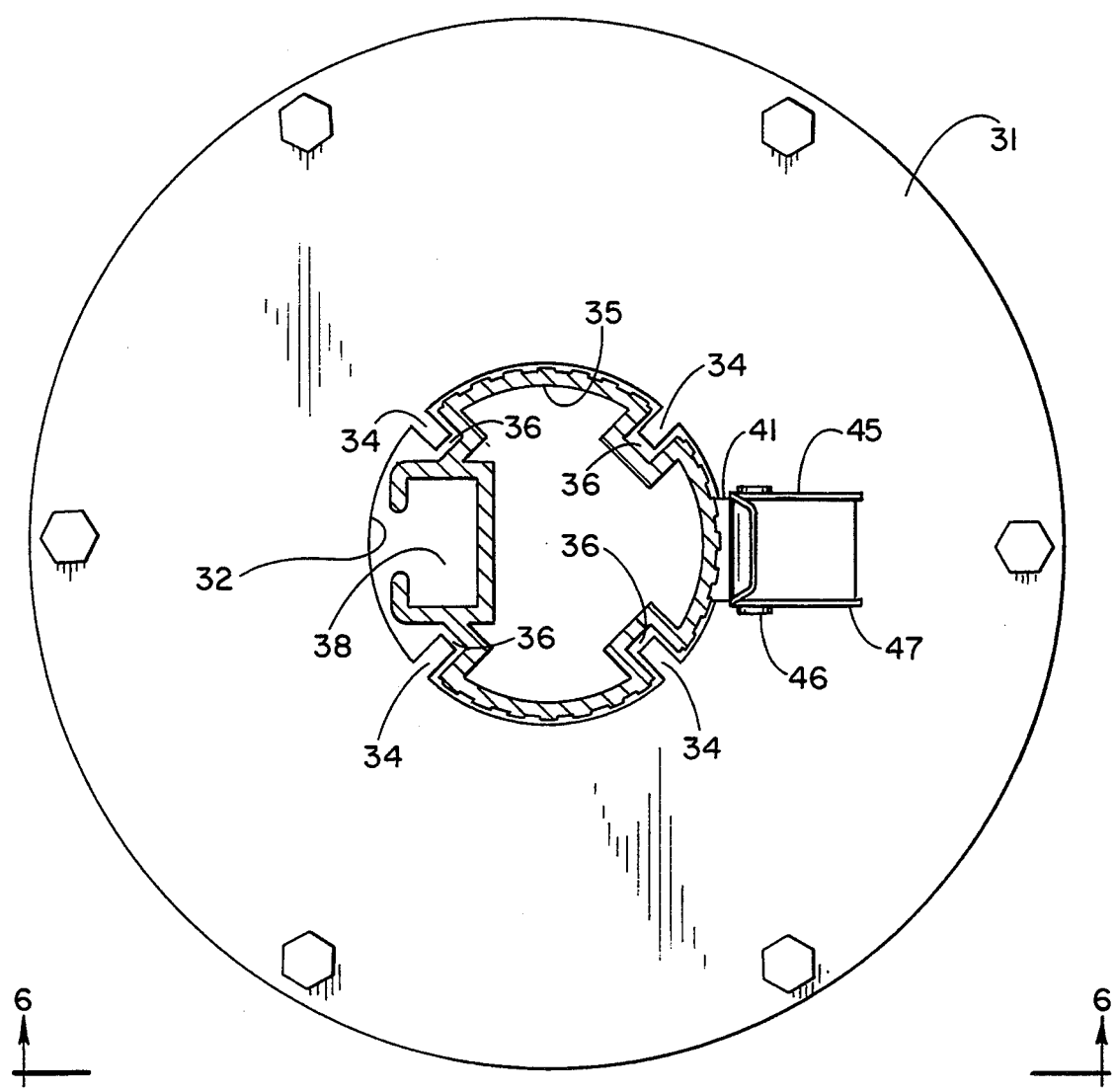
FIG. 5 is a sectioned view as taken along viewing line 5 of FIG. 4.
Figure 6:
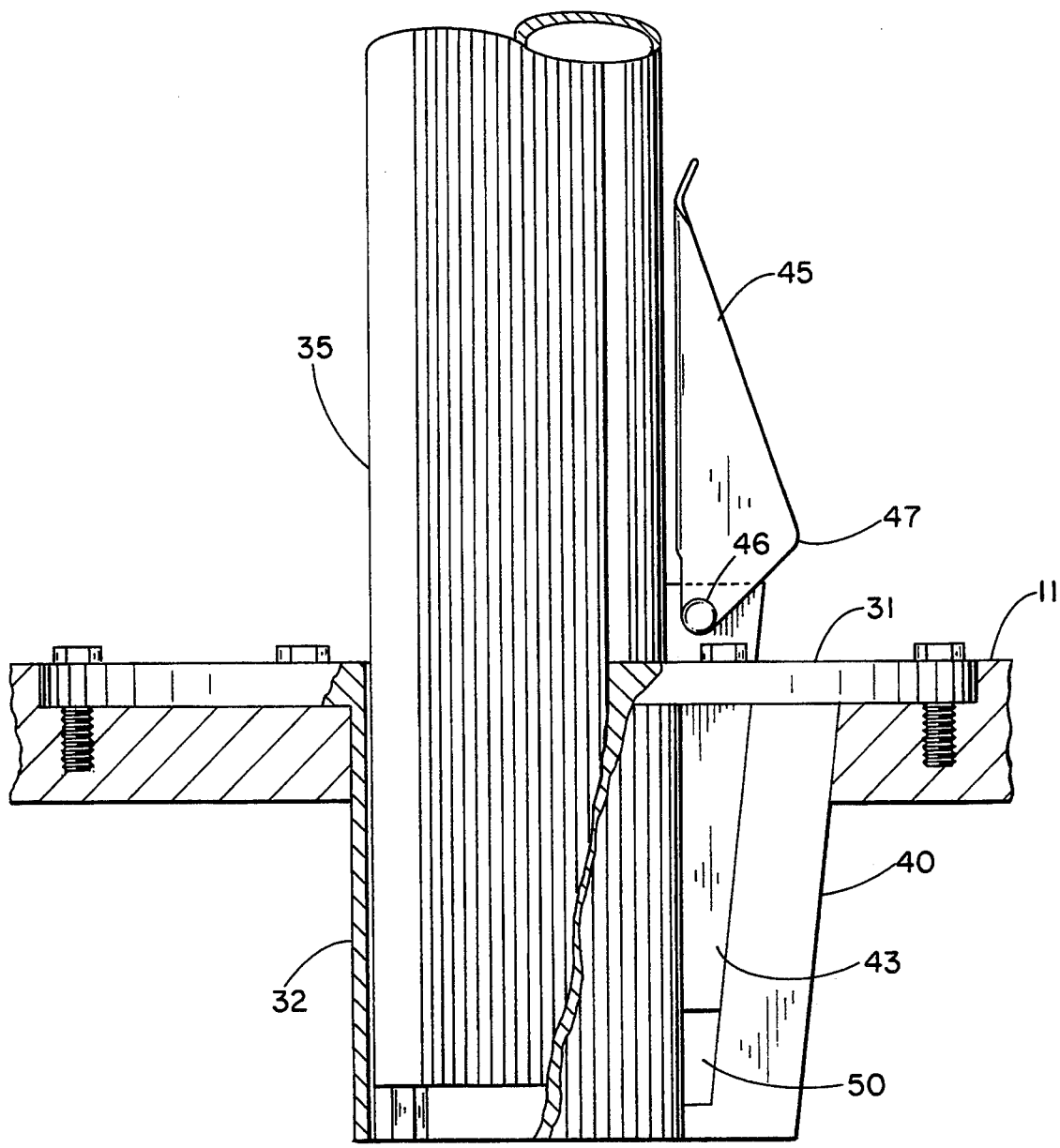

FIGS. 4 through 7 illustrate an alternative embodiment of the invention. A base member 33 comprises an annular rigid plate member 31 which is recessed into a support surface such as a floor or boat deck 11 and has a short section of rigid hollow tubular member 32 extending vertically downward at its center. Tubular member 32 is permanently attached to plate member 31 by welding or by being cast as an integral part thereof. Similar to tubular element 10 illustrate in the FIGS. 1–3 embodiment, tubular member 32 has a plurality of radially inwardly extending ribs 34 which are spaced around the periphery. An elongated rigid hollow tubular member 35 which is similar in construction to tubular member 14 of the FIGS. 1–3 embodiment has radially inwardly projecting recesses or grooves 36. Tubular member 35 is telescoped within tubular member 32 with ribs 34 of the latter slidably engaged in grooves 36 of the former in the same fashion as described earlier with respect to the FIGS. 1–3 embodiment. Another hollow rigid tubular element 37 has one end attached in any convenient fashion to the underside of a holding device such as a table top 38. Tubular element 37 is similar in construction to tubular element 32, having radially inwardly projecting fibs and is telescoped with tubular member 35 near the latter's upper end with the ribs slidably engaged in the corresponding grooves 36. This permits adjustment of the height or elevation of table top 38 to the desired level. When in the desired position, tubular element 37 is releasably locked with tubular element 35 by rotating knob 27 in the same fashion as described earlier with respect to the embodiment illustrated in FIGS. 1–3. As illustrated in FIG. 5, tubular element 35 has a U-shaped channel 38 for slidably carrying a nut and a nut carder, if desired, (not shown) which operate by rotating knob 27 to thread a rod (not shown) to tighten and release the frictional engagement of the grooves and ribs of tubular members 35 and 37 in the same fashion as described earlier with respect to the embodiment shown in FIGS. 1–3.

FIGS. 4–7 illustrate an alternative arrangement for releasably locking together the two telescoped tubular members. An inwardly angled tapered ramp 40 extends downward from base plate member 31 and a section of tubular member 32, having a length equal to the length of the ramp 40, is removed to provide an opening 41. This forms a tapered or narrowing chamber 50. With tubular member 35 positioned at the desired location within tubular member 32 a rigid tapered or wedge shaped cam block 43 is inserted into chamber 50 along ramp 40. As cam block 43 is inserted it is forced radially inward by the slope of ramp 40 to apply a radial force against tubular member 35 so that the sides and walls of the ribs 34 are forced tightly against the sides of the walls of the corresponding grooves 36 to frictionally lock tubular members 35 and 32 firmly together. A triangularly shaped cammed lever arm 45 is pivotally attached at 46 to cam block 43 and has a comer or cam edge 47 displaced outward therefrom. When arm 45 is pulled outward or away from tubular member 35, it pivots about pivot point 46 to bring cam edge 47 into contact with base plate member 31. By continuing to apply the pulling force on arm 45 it acts as a lever arm to lift cam block 43 out of chamber 50 so that the radial force is no longer applied to the tubular members and they can be slidably moved with respect to one another. An advantage and feature of this latter arrangement is that the tubular members can be locked together to provide a stable vertical holding support for a device such as table top 38, or the like, and when the holding device is no longer needed, the support can be removed by disconnecting the tubular members from one another and storing them away. Since base member 33 is recessed below the level of the floor or deck it can be covered over so that there is an unobstructed open area on the deck or floor where the support had been. The cam block and tapered ramp for applying the removable radial locking force between the two tubular members can be utilized as an alternative to the locking arrangement which utilizes a rotatable knob with threaded rod and nut in a U-channel as described with respect to the embodiment shown in FIGS. 1–3.

Also, cam block 43 may be permanently attached to or be an integral part of tubular member 35 so that when tubular member 35 is inserted into tubular member 32

(FIG. 6), it locks itself into place and when lever arm 47 is operated to release the two tubular members from one another (FIG. 7), tubular member 35 is raised out of its telescoped engagement with tubular member 32.

An alternative embodiment is illustrated in FIG. 8. This can be referred to as a knock-down nonadjustable combination. Similar to the arrangement shown in the lower half of FIG. 4, a tubular member 32 having ribs 34 (not shown) is inserted into and suitably rests on a deck or floor 11 by virtue of its attachment to flange or base plate member 31. An inwardly angled tapered ramp 40 extends downward from base plate member 31 and a section of tubular member 32 is removed to provide an opening which forms a tapered or narrowing chamber 50. Tubular member 51, which is similar to tubular member 32, is attached to the underside of a seat or chair or a table top 38 by a suitable base plate member or flange 52. An inwardly angled tapered ramp 53 extends upward towards the base plate member 52 and a length of tubular member 51 is removed to form a tapered or narrowing chamber 54. Elongated tubular member 35 having a number of lengthwise extending grooves 36 has tapered wedge-shaped cam blocks 55 at each end. The top and bottom ends of tubular member 35 are then inserted respectively into the tubular members 51 and 32 so that grooves 36 mate with or engage ribs 34. Cam blocks 55 acting on the tapered ramps 53 and 40 apply a radial inward force on tubular member 35 so that the grooves 36 come into fight frictional contact with the ribs 34 of tubular members 32 and 51 to hold and lock both tubular members firmly to tubular member 35. A lever arm arrangement similar to that described earlier with respect to FIGS. 4 through 7 can be provided to assist in releasing the engagement of the respective tubular members. Alternatively, in many cases enough force can be applied manually to pull apart the tubular support members.

I claim:

1. A support assembly, comprising:
   a first rigid tubular member having a plurality of elongated spaced-apart grooves parallel to its axis:
   a second rigid tubular member having a plurality of elongated spaced-apart ribs parallel to its axis:
   said first and second tubular members telescoped together with said ribs slidably engaged in said grooves; and
   means for releasably applying a radial force to one of said tubular members to bring said ribs into tight frictional contact within associated grooves to frictionally lock said tubular members together.

2. A support assembly as described in claim 1 wherein:
   said grooves on said first tubular member project radially inward and said ribs on said second tubular member project radially inward; and
   said first tubular member is telescoped within said second tubular member.

3. A support assembly as described in claim 1 wherein said means for releasably applying a radial force comprises:
   an elongated generally U-shaped channel in the inner tubular member, said channel parallel to the axis of the inner tubular member;
   a nut having an internally threaded opening, said nut slidably resting in said channel;
   a rod threaded at one end extending radially through the outer tubular member into threaded engagement with said nut opening; and
   a handle at the other of said rod for rotating said rod to thread and unthread said rod in the nut opening for respectively forcing and releasing said tubular members into and from frictional locking engagement.

4. A support assembly as described in claim 1 wherein said means for releasably applying a radial force comprises:
   an inwardly angled ramp extending part way along an end of one of said tubular members and a cam block for removably resting against said ramp for applying a radial force against the other of said tubular members.

5. A support assembly as described in claim 4 wherein said ramp forms a tapered chamber, said cam block removably inserted in said chamber in contact with said ramp and in contact with the other of said tubular members to apply increasing radial force to said other tubular member as said cam block moves along said ramp.

6. A support assembly, comprising:
   a) a base, said base comprising a rigid plate member for resting on a support surface and a rigid hollow tubular member extending axially of said plate member, said base tubular member having a plurality of elongated spaced-apart ribs parallel to its axis;
   b) a second rigid hollow tubular member, said second rigid tubular member having a plurality of elongated spaced-apart grooves parallel to its axis;
   c) means for attaching said second tubular member to a carrying device;
   d) said second tubular member telescoped with said base tubular member with said ribs slidably engaged in said grooves; and
   e) means for releasably applying a radial force to said base tubular member and said second tubular member for placing said fibs in fight frictional contact with associated grooves to frictionally lock together said base tubular member and said second tubular member.

7. A support assembly as described in claim 6 wherein said plate member rests horizontally on a support surface and said base tubular member extends downward from said plate member and is fixedly attached to said plate member.

8. A support assembly as described in claim 6 wherein said means for attaching said second tubular member to said carrying device comprises:
   a third rigid hollow tubular member having a plurality of elongated spaced-apart ribs parallel to its axis, said third tubular member telescoped with said second tubular member with its ribs slidably engaged in said grooves;
   said third tubular member attached at one end to the underside of a carrying device; and
   means for releasably applying a radial force to said second and third tubular members for placing said ribs in fight frictional contact with associated grooves to frictionally lock together said second and third tubular members.

9. A support assembly as described in claim 8 wherein said ribs and said grooves project radially inward and said second tubular member is telescoped within said base tubular member and said third tubular member.

10. A support assembly as described in claim 9 wherein said means for releasably applying a radial force to said second and third tubular members, comprises:

an elongated generally U-shaped channel in said second tubular member parallel to said grooves;

a nut having an internally threaded axial opening, said nut slidably resting in said channel;

a rod threaded at one end extending radially through the third tubular member to threadably engage the nut opening; and a handle on the other end of said rod for rotating said rod to thread and unthread the rod in the nut opening tier respectively forcing and releasing said second and third tubular members into and from frictional locking engagement.

* * * * *